United States Patent
Zuo et al.

(10) Patent No.: US 9,865,207 B2
(45) Date of Patent: Jan. 9, 2018

(54) LIQUID CRYSTAL DISPLAY PANEL OF COLUMN INVERSION DRIVING MODE AND DRIVING METHOD THEREOF

(71) Applicant: Wuhan China Star Optoelectronics Technology Co., Ltd., Wuhan (CN)

(72) Inventors: Qingcheng Zuo, Wuhan (CN); Jianxing Xie, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 289 days.

(21) Appl. No.: 14/777,525

(22) PCT Filed: Jun. 25, 2015

(86) PCT No.: PCT/CN2015/082268
§ 371 (c)(1),
(2) Date: Sep. 16, 2015

(87) PCT Pub. No.: WO2016/192153
PCT Pub. Date: Dec. 8, 2016

(65) Prior Publication Data
US 2017/0103719 A1    Apr. 13, 2017

(30) Foreign Application Priority Data

Jun. 2, 2015 (CN) .......................... 2015 1 0297185

(51) Int. Cl.
*G09G 3/36* (2006.01)
*G02F 1/1368* (2006.01)
*G02F 1/1362* (2006.01)

(52) U.S. Cl.
CPC ......... *G09G 3/3614* (2013.01); *G02F 1/1368* (2013.01); *G02F 1/136286* (2013.01); *G09G 3/3648* (2013.01); *G09G 2310/08* (2013.01)

(58) Field of Classification Search
CPC ............ G02F 1/136286; G02F 1/1368; G09G 2310/08; G09G 3/3648; G09G 3/3614
See application file for complete search history.

(56) References Cited

U.S. PATENT DOCUMENTS

2004/0080679 A1* 4/2004 Song ................. G02F 1/136227
349/43
2007/0001964 A1* 1/2007 Lee ...................... G09G 3/3614
345/96

(Continued)

*Primary Examiner* — Afroza Chowdhury
(74) *Attorney, Agent, or Firm* — Leong C. Lei

(57) ABSTRACT

The present invention provides a liquid crystal display panel of column inversion driving mode and a driving method thereof. With adding the charge control thin film transistor (T2) in the pixel driving circuit and according to the positive, negative voltages provided by the data line, the high, low voltage levels and pulse widths of the clock signal (CK) provided to the gate of the charge control thin film transistor (T2) are adjusted to control the times of respectively charging the pixels of two adjacent column with the positive, negative voltages, which can balance the charge effects of the pixels of two adjacent column with the positive, negative voltages to compensate the charge difference to the pixels of two adjacent columns caused by the positive, negative voltages for making the frame display effect uniform.

12 Claims, 8 Drawing Sheets

(56) References Cited

U.S. PATENT DOCUMENTS

| | | | | |
|---|---|---|---|---|
| 2010/0277494 A1* | 11/2010 | Cho | ................... | G09G 3/3614 |
| | | | | 345/589 |
| 2011/0141424 A1* | 6/2011 | Lee | ................... | C09K 19/0275 |
| | | | | 349/141 |
| 2011/0164076 A1* | 7/2011 | Lee | ................... | G09G 3/3406 |
| | | | | 345/691 |
| 2012/0086682 A1* | 4/2012 | Shi | ................... | G09G 3/3677 |
| | | | | 345/204 |

* cited by examiner

step 1, providing the liquid crystal display panel of column inversion driving mode;

the liquid crystal display panel of column inversion driving mode comprises a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor (T1), a charge control thin film transistor, a storage capacitor (CST1) and a liquid crystal capacitor (CLC1); one of the charge control thin film transistor (T2) in the pixel of even column and the charge control thin film transistor (T2') in the pixel of odd column is controlled by a high voltage level to be on, and the other is controlled by a low voltage level to be on;

both gates of the charge control thin film transistor (T2) in the pixel of even column and the charge control thin film transistor (T2') in the pixel of odd column are electrically coupled to a clock signal (CK);

— 1

↓ step 2, driving the liquid crystal display panel of column inversion driving mode to show a frame;
N, M are set to be positive integers, and for the pixel of Nth row, the Nth scan line provides a scan signal (GATE(N)) of which the duration is a first duration (t1) to the gate of the driving thin film transistor (T1) of the pixel of Nth row, and the clock signal (CK) first provides the high voltage level of which the duration is a second duration (t2) to control the charge control thin film transistor (T2) in the pixel of Nth row, even column, or the charge control thin film transistor (T2') in the pixel of Nth row, odd column to be on, and meanwhile, the corresponding data line (S(M)) provides a positive voltage to make a source voltage of the charge control thin film transistor (T1) in the pixel of Nth row, even column or a source voltage of the charge control thin film transistor (T1) in the pixel of Nth row, even column to be positive for charging the pixel of Nth row, even column or the pixel of odd column; then, the clock signal (CK) provides a low voltage level of which the duration is a third duration (t3) to control the charge control thin film transistor (T2') in the pixel of Nth row, odd column or the charge control thin film transistor (T2) in the pixel of even column, which is not on in the second duration (t2) to be on, and meanwhile, the corresponding data line S(M) provides a negative voltage to make the source voltage of the driving thin film transistor (T1) in the pixel of Nth row, odd column or the source voltage of the driving thin film transistor (T1) in the pixel of even column to be negative for charging the pixel of Nth row, odd column or the pixel of even column; the first duration (t1) is a sum of the second duration (t2) and the third duration (t3);
scanning row by row sequentially in the same way until driving the frame is accomplished;

— 2

↓ step 3, driving the liquid crystal display panel of column inversion driving mode to show a latter frame;
for the pixel of Nth row, the Nth scan line provides the scan signal (GATE(N)) of which the duration is the first duration (t1) to the gate of the driving thin film transistor (T1) of the pixel of Nth row, and the clock signal (CK) first provides the high voltage level of which the duration is the third duration (t3) to control the charge control thin film transistor (T2) in the pixel of Nth row, even column or the charge control thin film transistor (T2') in the pixel of Nth row, odd column to be on, and meanwhile, the data line (S(M)) provides a negative voltage to make a source voltage of the driving thin film transistor (T1) in the pixel of Nth row, even column or a source voltage of the driving thin film transistor (T1) in the pixel of Nth row, odd column to be negative for charging the pixel of Nth row, even column or the pixel of Nth row, odd column; then, the clock signal (CK) provides the low voltage level of which the duration is the second duration (t2) to control the charge control thin film transistor (T2') in the pixel of Nth row, odd column or the charge control thin film transistor (T2) in the pixel of Nth row, even column, which is not on in the third duration to be on, and meanwhile, the data line (S(M)) provides a positive voltage to make the source voltage of the driving thin film transistor (T1) in the pixel of Nth row, odd column or the source voltage of the driving thin film transistor (T1) in the pixel of Nth row, even column to be positive for charging the pixel of Nth row, odd column or the pixel of Nth row, even column;
scanning row by row sequentially in the same way until driving the latter frame is accomplished;

— 3

↓ step 4, cycling steps 2, 3 for driving the liquid crystal display panel of column inversion driving mode to continuously show frames.

LIQUID CRYSTAL DISPLAY PANEL OF COLUMN INVERSION DRIVING MODE AND DRIVING METHOD THEREOF

FIELD OF THE INVENTION

The present invention relates to a display technology field, and more particularly to a liquid crystal display panel of column inversion driving mode and a driving method thereof.

BACKGROUND OF THE INVENTION

The LCD (Liquid Crystal Display) possesses many advantages of being ultra thin, power saved and radiation free. It has been widely utilized in, such as LCD TVs, mobile phones, Personal Digital Assistant (PDA), digital cameras, laptop screens or notebook screens, and dominates the flat panel display field.

Most of the liquid crystal displays on the present market are backlight type liquid crystal displays, which comprise a liquid crystal display panel and a backlight module. The working principle of the liquid crystal display panel is that the Liquid Crystal is injected between the Thin Film Transistor Array Substrate (TFT array substrate) and the Color Filter (CF). The light of backlight module is refracted to generate images by applying driving voltages to the two substrates for controlling the rotations of the liquid crystal molecules.

The liquid crystal display panel comprises a plurality of pixels arranged in array. Each pixel is electrically coupled to one thin film transistor (TFT), and a gate (Gate) of the TFT is coupled to a horizontal scan line, and a drain is coupled to a vertical data line, and a source is coupled to a pixel electrode. The enough voltage is applied to the level scan line, and all the TFTs electrically coupled to the scan line are activated. Thus, the signal voltage on the data line can be written into the pixel to control the transmittances of liquid crystals to achieve the display effect.

The liquid crystal molecules have a certain property, which is that the liquid crystal molecules will be polarized if the voltage of the same direction is applied to the liquid crystal molecules with a long period of time. Even the voltage disappears, the property of the liquid crystal molecules will be destroyed and can no longer be rotated due to the variation of the electrical field. Therefore, the liquid crystal display panel must be driven alternately. As showing images, the liquid crystal molecules are rotated with a certain frequency to prevent that the liquid crystal molecules fixedly lean to the same direction and lose the activity. At present, the liquid crystal display panel supports the multiple inversion modes, such as dot inversion mode, row inversion mode, column inversion mode, and etc. The way of achieving the inversion is mainly to constantly alter the positive, negative polarities of the source voltage of the TFT (i.e. the positive, negative polarities of the signal voltage), or constantly alter the positive, negative polarities of the common electrode to realize the objective of the alternate drive. When the liquid crystal display panel normally functions, the voltage difference between the positive, negative source voltages of the TFT (i.e. the signal voltage) and the gate voltage are different, and thus, in the same period of time, the charge effects of the TFT sources to the pixels shows to be different. Accordingly, the brightnesses of respective pixels in the display image differ. Ultimately, the image display effect is nonuniform.

FIG. 1 is a circuit diagram of a liquid crystal display panel of column inversion driving mode according to prior art, and FIG. 2 is a sequence diagram of the circuit shown in FIG. 1. Please refer to FIG. 1. The liquid crystal display panel of column inversion driving mode according to prior art comprises a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of the same column are electrically coupled to the data line corresponding to the pixel of the column. The pixel driving circuit comprises: a driving thin film transistor T1, and a gate of the driving thin film transistor T1 is electrically coupled to the scan line corresponding the row where the pixel is, and a source is electrically coupled to the data line corresponding the column where the pixel is, and a drain is electrically coupled to one end of a storage capacitor CST1 and one end of a liquid crystal capacitor CLC1; the storage capacitor CST1, the other end of the storage capacitor CST1 is electrically coupled to a common electrode VCOM; the liquid crystal capacitor CLC1, and the other end of the liquid crystal capacitor CLC1 is electrically coupled to the common electrode VCOM. Because the liquid crystal display panel shown in FIG. 1 utilizes column inversion driving mode, referring to FIG. 3, FIG. 4, the polarities of source voltages of the driving thin film transistors T1 in the pixels of every two adjacent columns are opposite, and the polarities of source voltages of the driving thin film transistors T1 in the same pixel for every two adjacent frames are opposite. Specifically, with combination of FIG, FIG. 2, the driving procedure of the liquid crystal display panel of column inversion driving mode according to prior art showing a frame: the plurality of scan lines sequentially scan row by row, and N, M are set to be positive integers. As scan is performed to the Nth scan line, the Nth scan line provides a scan signal GATE(N) to the gates of the driving thin film transistors T1 of the pixels of Nth row, and all the driving thin film transistor T1 of the pixels of Nth row are activated. For the pixels of adjacent Mth column and M+1th column, the Mth data line S(M) writes positive voltage into the source of the driving thin film transistor T1 of Nth row, Mth column, and the length of the writing period is t; the M+1th data line adjacent to the Mth data line S(M) writes negative voltage into the source of the driving thin film transistor T1 of Nth row, M+1 th column, and the length of the writing period is also t; because the polarity of the source voltage of the driving thin film transistor T1 of Nth row, Mth column is positive, and the polarity of the source voltage of the driving thin film transistor T1 of Nth row, M+1th column is negative, and the gate voltages of the driving thin film transistors T1 of Nth row, Mth column and the Nth row, M+1th column are the same, the voltage difference formed by the source voltages of the driving thin film transistors of the pixels of Mth column, M+1th column and the gate voltage are different. Under the circumstance that the pixel charge periods of the pixels of Mth column, M+1th column are the same (both are t1), the charge effects of the pixels of the two columns are different. The display brightnesses of the pixels of Mth column and M+1th column differ. Ultimately, the image display effect is nonuniform.

SUMMARY OF THE INVENTION

An objective of the present invention is to provide a liquid crystal display panel of column inversion driving mode, capable of balancing the charge effects of the pixels of two adjacent column with the positive, negative voltages to compensate the charge difference to the pixels of two adjacent columns caused by the positive, negative voltages for making the frame display effect uniform.

Another objective of the present invention is to provide a driving method of a liquid crystal display panel of column inversion driving mode, capable of balancing the charge effects of the pixels of two adjacent column with the positive, negative voltages to compensate the charge difference to the pixels of two adjacent columns caused by the positive, negative voltages for making the frame display effect uniform.

For realizing the aforesaid objectives, the present invention provides a liquid crystal display panel of column inversion driving mode, comprising a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor, a charge control thin film transistor, a storage capacitor and a liquid crystal capacitor; one of the charge control thin film transistor in the pixel of even column and the charge control thin film transistor in the pixel of odd column is controlled by a high voltage level to be on, and the other is controlled by a low voltage level to be on;

both gates of the charge control thin film transistor in the pixel of even column and the charge control thin film transistor in the pixel of odd column are electrically coupled to a clock signal; the clock signal alternately provides the high, low voltage levels to control the charge control thin film transistor in the pixel of even column and the charge control thin film transistor in the pixel of odd column to be alternately on;

as the liquid crystal display panel of column inversion driving mode shows two adjacent frames: in the previous frame, the scan line provides a scan signal of which the duration is a first duration, and the clock signal first provides the high voltage level of which the duration is a second duration to control the charge control thin film transistor in the pixel of even column or the charge control thin film transistor in the pixel of odd column to be on, and meanwhile, the data line provides a positive voltage to make a source voltage of the driving thin film transistor in the pixel of even column or a source voltage of the driving thin film transistor in the pixel of odd column to be positive for charging the pixel of even column or the pixel of odd column; then, the clock signal provides a low voltage level of which the duration is a third duration to control the charge control thin film transistor in the pixel of odd column or the charge control thin film transistor in the pixel of even column, which is not on in the second duration to be on, and meanwhile, the data line provides a negative voltage to make the source voltage of the driving thin film transistor in the pixel of odd column or the source voltage of the driving thin film transistor in the pixel of even column to be negative for charging the pixel of odd column or the pixel of even column;

in the latter frame, the scan line provides the scan signal of which the duration is the first duration, and the clock signal first provides the high voltage level of which the duration is the third duration to control the charge control thin film transistor in the pixel of even column or the charge control thin film transistor in the pixel of odd column to be on, and meanwhile, the data line provides a negative voltage to make a source voltage of the driving thin film transistor in the pixel of even column or a source voltage of the driving thin film transistor in the pixel of odd column to be negative for charging the pixel of even column or the pixel of odd column; then, the clock signal provides the low voltage level of which the duration is the second duration to control the charge control thin film transistor in the pixel of odd column or the charge control thin film transistor in the pixel of even column, which is not on in the third duration to be on, and meanwhile, the data line provides a positive voltage to make the source voltage of the driving thin film transistor in the pixel of odd column or the source voltage of the driving thin film transistor in the pixel of even column to be positive for charging the pixel of odd column or the pixel of even column;

the first duration is a sum of the second duration and the third duration.

The third duration is not equal to the second duration.

The third duration is larger than the second duration.

A gate of the driving thin film transistor is electrically coupled to the scan line corresponded with the row where the pixel is, and a source is electrically coupled to a drain of the charge control thin film transistor, and a drain is electrically coupled to one end of the storage capacitor and one end of the liquid crystal capacitor; a source of the charge control thin film transistor is electrically coupled to the data line corresponded with the column where the pixel is; both the other end of the storage capacitor and the other end of the liquid crystal capacitor are electrically coupled to a common electrode;

the charge control thin film transistor in the pixel of odd column is a P-type thin film transistor, and the charge control thin film transistor in the pixel of even column is a N-type thin film transistor; or the charge control thin film transistor in the pixel of odd column is a N-type thin film transistor, and the charge control thin film transistor in the pixel of even column is a P-type thin film transistor.

The driving thin film transistor and the charge control thin film transistor are Low Temperature Poly-silicon thin film transistors, oxide semiconductor thin film transistors or amorphous silicon thin film transistors.

The present invention further provides a liquid crystal display panel of column inversion driving mode, comprising a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor, a charge control thin film transistor, a storage capacitor and a liquid crystal capacitor; one of the charge control thin film transistor in the pixel of even column and the charge control thin film transistor in the pixel of odd column is controlled by a high voltage level to be on, and the other is controlled by a low voltage level to be on;

both gates of the charge control thin film transistor in the pixel of even column and the charge control thin film transistor in the pixel of odd column are electrically coupled to a clock signal; the clock signal alternately provides the high, low voltage levels to control the charge control thin film transistor in the pixel of even column and the charge control thin film transistor in the pixel of odd column to be alternately on;

as the liquid crystal display panel of column inversion driving mode shows two adjacent frames: in the previous frame, the scan line provides a scan signal of which the duration is a first duration, and the clock signal first provides the high voltage level of which the duration is a second duration to control the charge control thin film transistor in the pixel of even column or the charge control thin film transistor in the pixel of odd column to be on, and meanwhile, the data line provides a positive voltage to make a source voltage of the driving thin film transistor in the pixel of even column or a source voltage of the driving thin film transistor in the pixel of odd column to be positive for charging the pixel of even column or the pixel of odd column; then, the clock signal provides a low voltage level of which the duration is a third duration to control the charge control thin film transistor in the pixel of odd column or the charge control thin film transistor in the pixel of even column, which is not on in the second duration to be on, and meanwhile, the data line provides a negative voltage to make the source voltage of the driving thin film transistor in the pixel of odd column or the source voltage of the driving thin film transistor in the pixel of even column to be negative for charging the pixel of odd column or the pixel of even column;

in the latter frame, the scan line provides the scan signal of which the duration is the first duration, and the clock signal first provides the high voltage level of which the duration is the third duration to control the charge control thin film transistor in the pixel of even column or the charge control thin film transistor in the pixel of odd column to be on, and meanwhile, the data line provides a negative voltage to make a source voltage of the driving thin film transistor in the pixel of even column or a source voltage of the driving thin film transistor in the pixel of odd column to be negative for charging the pixel of even column or the pixel of odd column; then, the clock signal provides the low voltage level of which the duration is the second duration to control the charge control thin film transistor in the pixel of odd column or the charge control thin film transistor in the pixel of even column, which is not on in the third duration to be on, and meanwhile, the data line provides a positive voltage to make the source voltage of the driving thin film transistor in the pixel of odd column or the source voltage of the driving thin film transistor in the pixel of even column to be positive for charging the pixel of odd column or the pixel of even column;

the first duration is a sum of the second duration and the third duration;

wherein the third duration is not equal to the second duration;

wherein a gate of the driving thin film transistor is electrically coupled to the scan line corresponded with the row where the pixel is, and a source is electrically coupled to a drain of the charge control thin film transistor, and a drain is electrically coupled to one end of the storage capacitor and one end of the liquid crystal capacitor; a source of the charge control thin film transistor is electrically coupled to the data line corresponded with the column where the pixel is; both the other end of the storage capacitor and the other end of the liquid crystal capacitor are electrically coupled to a common electrode;

the charge control thin film transistor in the pixel of odd column is a P-type thin film transistor, and the charge control thin film transistor in the pixel of even column is a N-type thin film transistor; or the charge control thin film transistor in the pixel of odd column is a N-type thin film transistor, and the charge control thin film transistor in the pixel of even column is a P-type thin film transistor;

wherein the driving thin film transistor and the charge control thin film transistor are Low Temperature Polysilicon thin film transistors, oxide semiconductor thin film transistors or amorphous silicon thin film transistors.

The present invention further provides a driving method of a liquid crystal display panel of column inversion driving mode, comprising steps of:

step 1, providing the liquid crystal display panel of column inversion driving mode;

the liquid crystal display panel of column inversion driving mode comprises a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor, a charge control thin film transistor, a storage capacitor and a liquid crystal capacitor; one of the charge control thin film transistor in the pixel of even column and the charge control thin film transistor in the pixel of odd column is controlled by a high voltage level to be on, and the other is controlled by a low voltage level to be on;

both gates of the charge control thin film transistor in the pixel of even column and the charge control thin film transistor in the pixel of odd column are electrically coupled to a clock signal;

step 2, driving the liquid crystal display panel of column inversion driving mode to show a frame;

setting N, M to be positive integers, and for the pixel of Nth row, the Nth scan line provides a scan signal of which the duration is a first duration to the gate of the driving thin film transistor of the pixel of Nth row, and the clock signal first provides the high voltage level of which the duration is a second duration to control the charge control thin film transistor in the pixel of Nth row, even column or the charge control thin film transistor in the pixel of Nth row, odd column to be on, and meanwhile, the corresponding data line provides a positive voltage to make a source voltage of the driving thin film transistor in the pixel of Nth row, even column or a source voltage of the driving thin film transistor in the pixel of Nth row, odd column to be positive for charging the pixel of Nth row, even column or the pixel of Nth row, odd column; then, the clock signal provides a low voltage level of which the duration is a third duration to control the charge control thin film transistor in the pixel of Nth row, odd column or the charge control thin film transistor in the pixel of Nth row, even column, which is not on in the second duration to be on, and meanwhile, the corresponding data line provides a negative voltage to make the source voltage of the driving thin film transistor in the pixel of Nth row, odd column or the source voltage of the driving thin film transistor in the pixel of Nth row, even column to be negative for charging the pixel of Nth row, odd column or the pixel of Nth row, even column; the first duration is a sum of the second duration and the third duration;

scanning row by row sequentially in the same way until driving the frame is accomplished;

step 3, driving the liquid crystal display panel of column inversion driving mode to show a latter frame;

for the pixel of Nth row, the Nth scan line provides the scan signal of which the duration is the first duration to the gate of the driving thin film transistor of the pixel of Nth row, and the clock signal first provides the high voltage level of which the duration is the third duration to control the charge control thin film transistor in the pixel of Nth row, even column or the charge control thin film transistor in the pixel of Nth row, odd column to be on, and meanwhile, the data line provides a negative voltage to make a source voltage of the driving thin film transistor in the pixel of Nth row, even column or a source voltage of the driving thin film transistor in the pixel of Nth row, odd column to be negative for charging the pixel of Nth row, even column or the pixel of Nth row, odd column; then, the clock signal provides the low voltage level of which the duration is the second duration to control the charge control thin film transistor in the pixel of Nth row, odd column or the charge control thin film transistor in the pixel of Nth row, even column, which is not on in the third duration to be on, and meanwhile, the data line provides a positive voltage to make the source voltage of the driving thin film transistor in the pixel of Nth row, odd column or the source voltage of the driving thin film transistor in the pixel of Nth row, even column to be positive for charging the pixel of Nth row, odd column or the pixel of Nth row, even column;

scanning row by row sequentially in the same way until driving the latter frame is accomplished;

step 4, cycling steps 2, 3 for driving the liquid crystal display panel of column inversion driving mode to continuously show frames.

The third duration is not equal to the second duration.

The third duration is larger than the second duration.

A gate of the driving thin film transistor is electrically coupled to the scan line corresponded with the row where the pixel is, and a source is electrically coupled to a drain of the charge control thin film transistor, and a drain is electrically coupled to one end of the storage capacitor and one end of the liquid crystal capacitor; a source of the charge control thin film transistor is electrically coupled to the data line corresponded with the column where the pixel is; both the other end of the storage capacitor and the other end of the liquid crystal capacitor are electrically coupled to a common electrode;

the charge control thin film transistor in the pixel of odd column is a P-type thin film transistor, and the charge control thin film transistor in the pixel of even column is a N-type thin film transistor; or the charge control thin film transistor in the pixel of odd column is a N-type thin film transistor, and the charge control thin film transistor in the pixel of even column is a P-type thin film transistor.

The driving thin film transistor and the charge control thin film transistor are Low Temperature Poly-silicon thin film transistors, oxide semiconductor thin film transistors or amorphous silicon thin film transistors.

The benefits of the present invention are: the present invention provides a liquid crystal display panel of column inversion driving mode and a driving method thereof. With adding the charge control thin film transistor in the pixel driving circuit and according to the positive, negative voltages provided by the data line, the high, low voltage levels and pulse widths of the clock signal provided to the gate of the charge control thin film transistor are adjusted to control the times of respectively charging the pixels of two adjacent column with the positive, negative voltages, which can balance the charge effects of the pixels of two adjacent column with the positive, negative voltages to compensate the charge difference to the pixels of two adjacent columns caused by the positive, negative voltages for making the frame display effect uniform.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings,

FIG. 3 is a polarity diagram of the liquid crystal display panel of column inversion driving mode showing a frame;

FIG. 4 is a polarity diagram of a latter frame of the frame shown in FIG. 3;

FIG. 8 is a flowchart of a driving method of a liquid crystal display panel of column inversion driving mode according to the present invention.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
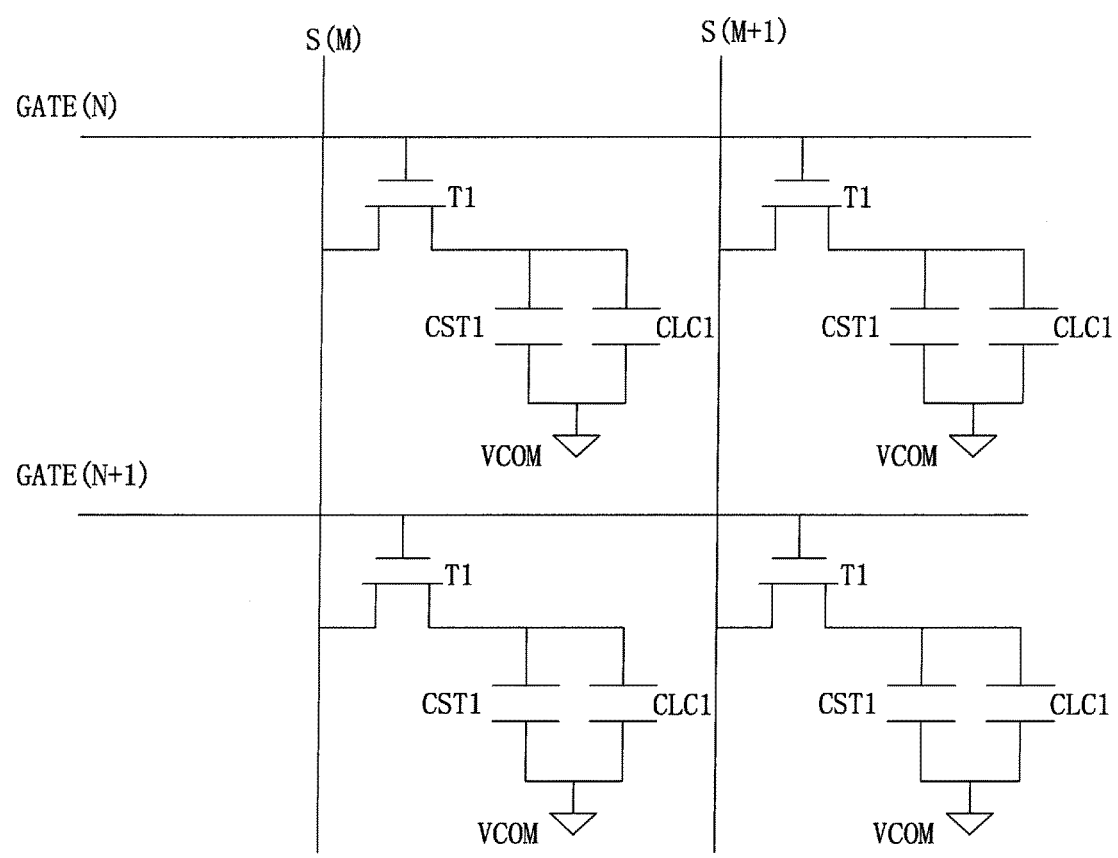
FIG. 1 is a circuit diagram of a liquid crystal display panel of column inversion driving mode according to prior art.
Figure 2:
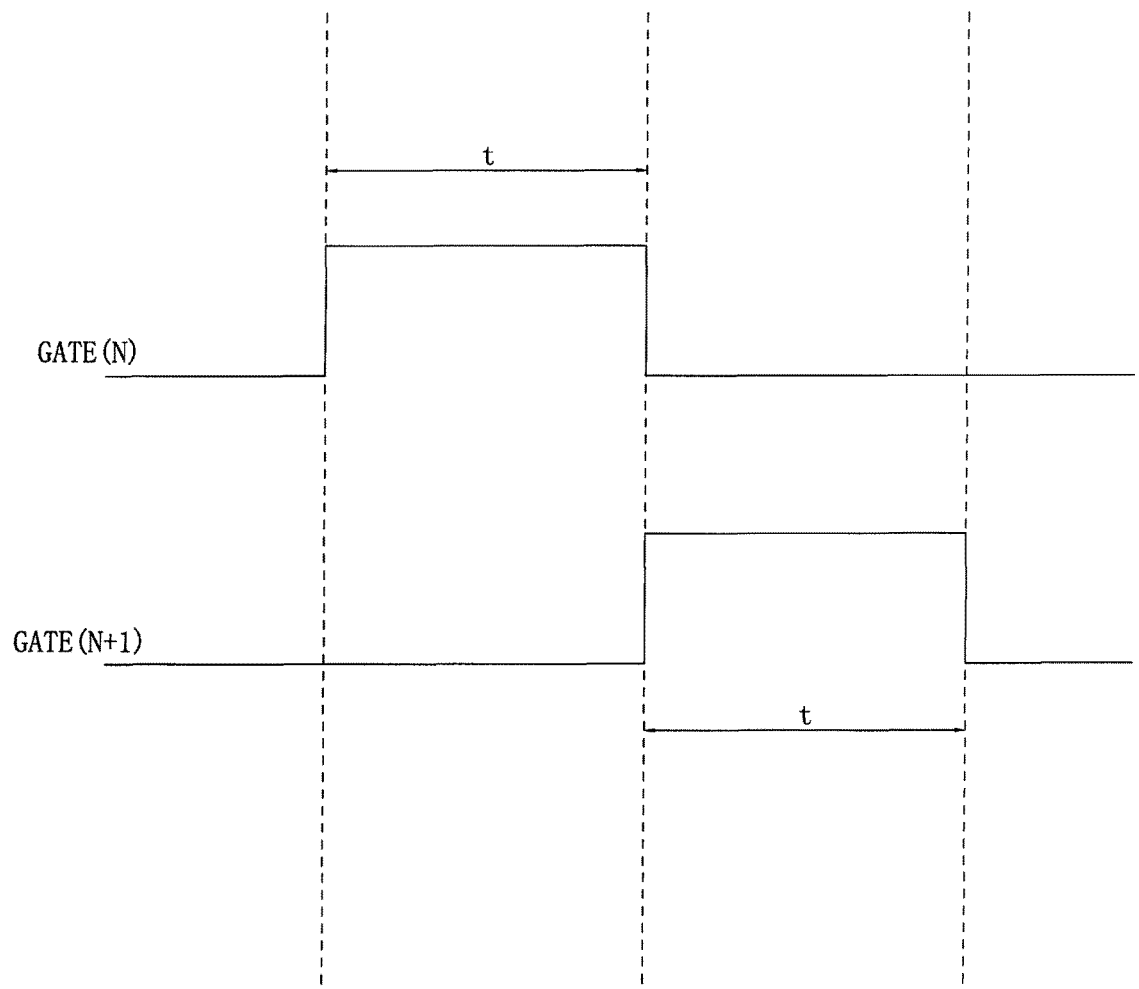
FIG. 2 is a sequence diagram of the circuit shown in FIG. 1.
Figure 5:
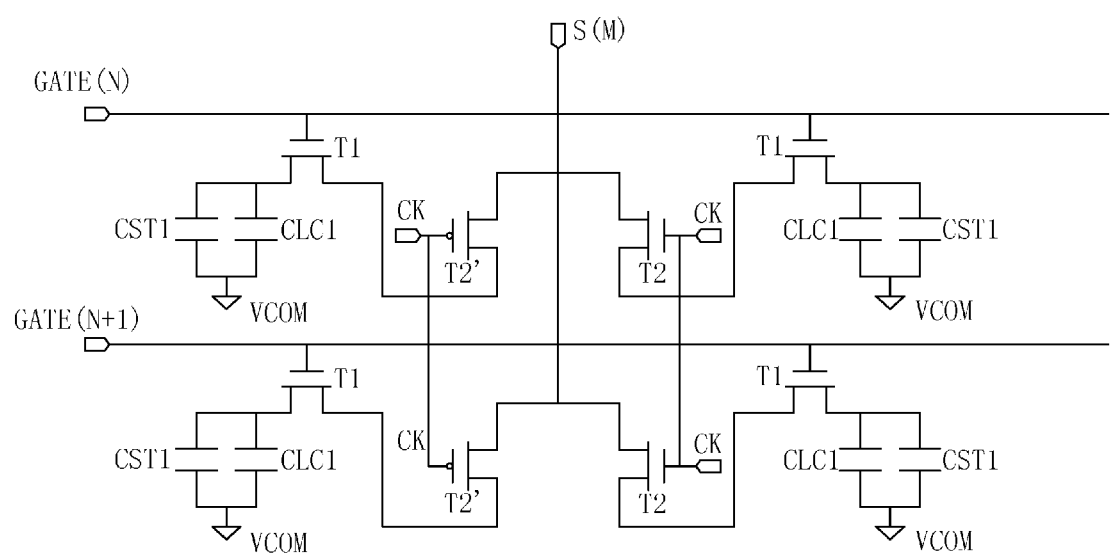
FIG. 5 is a circuit diagram of a liquid crystal display panel of column inversion driving mode according to the present invention.
Figure 6:
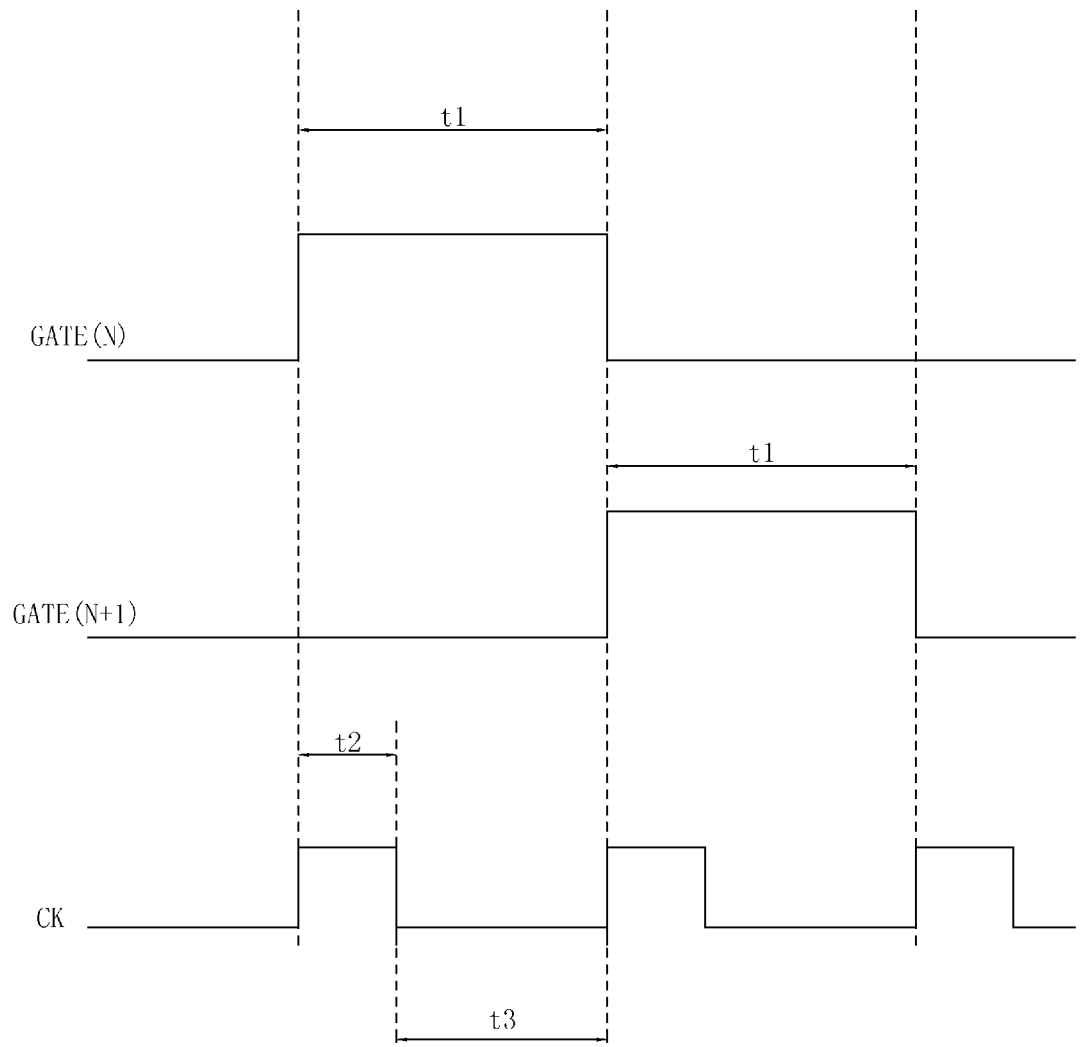
FIG. 6 is a sequence diagram of the liquid crystal display panel of column inversion driving mode showing a frame according to the present invention.
Figure 7:
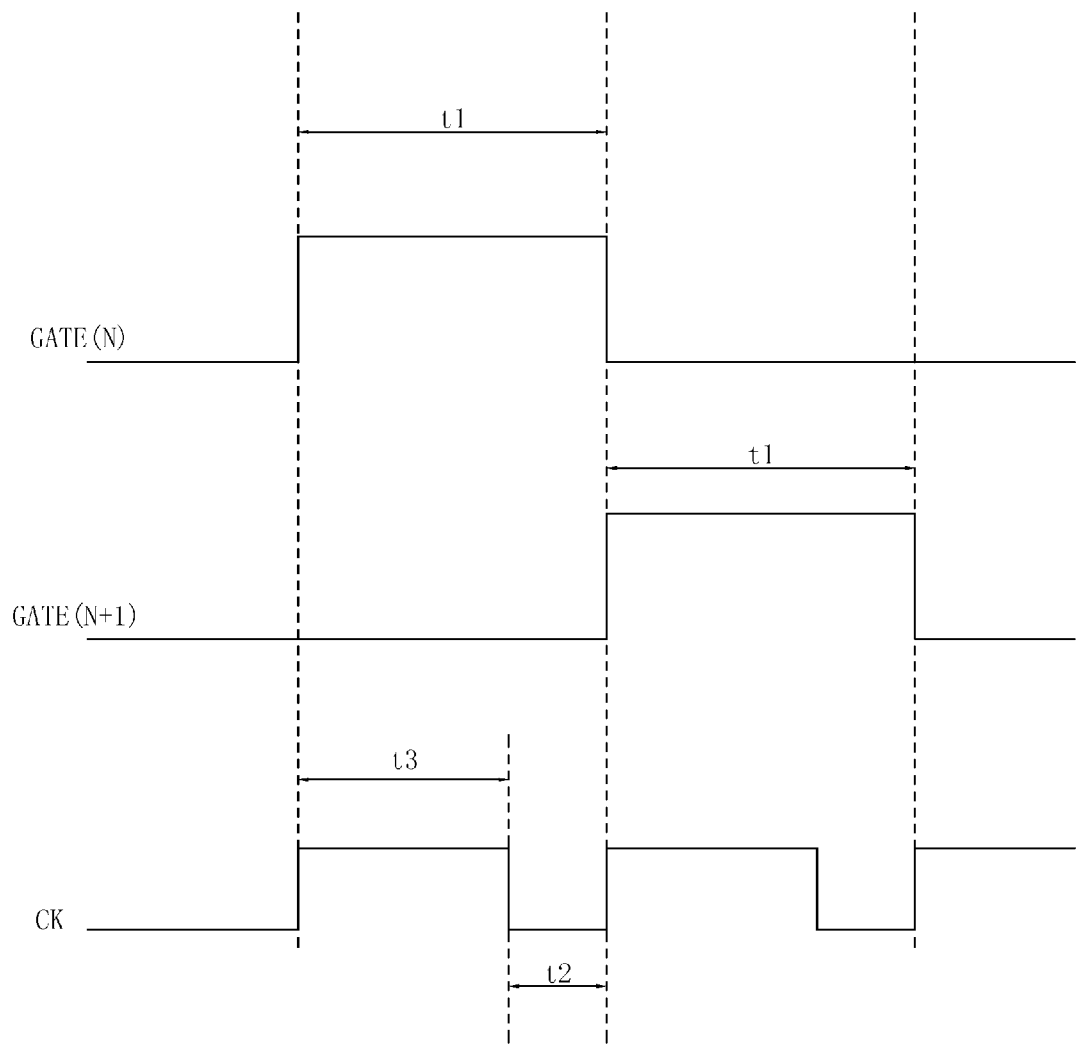
FIG. 7 is a sequence diagram of a latter frame of the frame shown in FIG. 6.

Please refer from FIG. 5 to FIG. 7. The present invention first provides a liquid crystal display panel of column inversion driving mode, comprising a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line.

The pixel driving circuit comprises: a driving thin film transistor T1, a charge control thin film transistor, a storage capacitor CST1 and a liquid crystal capacitor CLC1.

A gate of the driving thin film transistor T1 is electrically coupled to the scan line corresponded with the row where the pixel is, and a source is electrically coupled to a drain of the charge control thin film transistor, and a drain is electrically coupled to one end of the storage capacitor CST1 and one end of the liquid crystal capacitor CLC1; a gate of the charge control thin film transistor is electrically coupled to a clock signal CK, and a source is electrically coupled to the data line corresponded with the column where the pixel is; both the other end of the storage capacitor CST1 and the other end of the liquid crystal capacitor CLC1 are electrically coupled to a common electrode VCOM.

One of the charge control thin film transistor T2 in the pixel of even column and the charge control thin film transistor T2' in the pixel of odd column is controlled by a high voltage level to be on, and the other is controlled by a low voltage level to be on. Furthermore, the charge control thin film transistor T2' in the pixel of odd column is a P-type thin film transistor, and the charge control thin film transistor T2 in the pixel of even column is a N-type thin film transistor; or the charge control thin film transistor T2' in the pixel of odd column is a N-type thin film transistor, and the charge control thin film transistor T2 in the pixel of even column is a P-type thin film transistor.

The clock signal CK alternately provides the high, low voltage levels to control the charge control thin film transistor T2 in the pixel of even column and the charge control thin film transistor T2' in the pixel of odd column to be alternately on.

As an illustration that the charge control thin film transistor T2' in the pixel of odd column is a P-type thin film transistor, and the charge control thin film transistor T2 in the pixel of even column is a N-type thin film transistor, as the liquid crystal display panel of column inversion driving mode shows two adjacent frames: in the previous frame, the scan line provides a scan signal of which the duration is a first duration t1, and the clock signal CK first provides the high voltage level of which the duration is a second duration t2 to control the charge control thin film transistor T2 in the pixel of even column to be on, and meanwhile, the data line provides a positive voltage to make a source voltage of the driving thin film transistor T1 in the pixel of even column to be positive for charging the pixel of even column; then, the clock signal CK provides a low voltage level of which the duration is a third duration t3 to control the charge control thin film transistor T2' in the pixel of odd column to be on, and meanwhile, the data line provides a negative voltage to make the source voltage of the driving thin film transistor T1 in the pixel of odd column to be negative for charging the pixel of odd column.

In the latter frame, the scan line provides the scan signal of which the duration is the first duration t1, and the clock signal CK first provides the high voltage level of which the duration is the third duration t3 to control the charge control thin film transistor T2 in the pixel of even column to be on, and meanwhile, the data line provides a negative voltage to make a source voltage of the driving thin film transistor T1 in the pixel of even column to be negative for charging the pixel of even column; then, the clock signal CK provides the low voltage level of which the duration is the second duration t2 to control the charge control thin film transistor T2' in the pixel of odd column to be on, and meanwhile, the data line provides a positive voltage to make the source voltage of the driving thin film transistor T1 in the pixel of odd column to be positive for charging the pixel of odd column.

The first duration t1 is a sum of the second duration t2 and the third duration t3.

Specifically, the third duration t3 is not equal to the second duration t2, and the third duration t3 is larger than the second duration t2. That is to say, the charge duration of the negative voltage is not equal to the charge duration of the positive voltage, and the charge duration of the negative voltage is larger than the charge duration of the positive voltage. The clock signal CK is performed with pulse width modulation to adjust the lengths of the second, third duration t2, t3, and thus, the charge durations of the negative voltage and the positive voltage can be adjusted. The driving thin film transistor T1 and the charge control thin film transistor T2 are Low Temperature Poly-silicon thin film transistors, oxide semiconductor thin film transistors or amorphous silicon thin film transistors.

Furthermore, as the charge control thin film transistor T2' in the pixel of odd column is a N-type thin film transistor, and the charge control thin film transistor T2 in the pixel of even column is a P-type thin film transistor, the pixel of odd column needs to be charged first, and then the pixel of even column is charged. The rest is similar as the aforesaid procedure. The repeated description is omitted here.

The present invention provides a liquid crystal display panel of column inversion driving mode. With adding the charge control thin film transistor T2 in the pixel driving circuit and according to the positive, negative voltages provided by the data line, the high, low voltage levels and pulse widths of the clock signal CK provided to the gate of the charge control thin film transistor T2 are adjusted to control the times of respectively charging the pixels of two adjacent column with the positive, negative voltages, which can balance the charge effects of the pixels of two adjacent column with the positive, negative voltages to compensate the charge difference to the pixels of two adjacent columns caused by the positive, negative voltages for making the frame display effect uniform.

Please refer to FIG. 8. The present invention further provides a driving method of a liquid crystal display panel of column inversion driving mode, comprising steps of:

Step 1, providing the liquid crystal display panel of column inversion driving mode.

As shown in FIG. 5, the liquid crystal display panel of column inversion driving mode comprises a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line.

The pixel driving circuit comprises: a driving thin film transistor T1, a charge control thin film transistor, a storage capacitor CST1 and a liquid crystal capacitor CLC1.

A gate of the driving thin film transistor T1 is electrically coupled to the scan line corresponded with the row where the pixel is, and a source is electrically coupled to a drain of the charge control thin film transistor, and a drain is electrically coupled to one end of the storage capacitor CST1 and one end of the liquid crystal capacitor CLC1; a gate of the charge control thin film transistor is electrically coupled to a clock signal CK, and a source is electrically coupled to the data line corresponded with the column where the pixel is; both the other end of the storage capacitor CST1 and the other end of the liquid crystal capacitor CLC1 are electrically coupled to a common electrode VCOM.

One of the charge control thin film transistor T2 in the pixel of even column and the charge control thin film transistor T2' in the pixel of odd column is controlled by a high voltage level to be on, and the other is controlled by a low voltage level to be on. Furthermore, the charge control thin film transistor T2' in the pixel of odd column is a P-type thin film transistor, and the charge control thin film transistor T2 in the pixel of even column is a N-type thin film transistor; or the charge control thin film transistor T2' in the pixel of odd column is a N-type thin film transistor, and the charge control thin film transistor T2 in the pixel of even column is a P-type thin film transistor.

Specifically, the driving thin film transistor T1 and the charge control thin film transistor T2 are Low Temperature Poly-silicon thin film transistors, oxide semiconductor thin film transistors or amorphous silicon thin film transistors.

Step 2, driving the liquid crystal display panel of column inversion driving mode to show a frame.

Please combine FIG. 5 and FIG. 6. As an illustration that the charge control thin film transistor T2' in the pixel of odd column is a P-type thin film transistor, and the charge control thin film transistor T2 in the pixel of even column is a N-type thin film transistor, N, M are set to be positive integers, and for the pixel of Nth row, the Nth scan line provides a scan signal GATE(N) of which the duration is a first duration t1 to the gate of the driving thin film transistor T1 of the pixel of Nth row, and the clock signal CK first provides the high voltage level of which the duration is a second duration t2 to control the charge control thin film transistor T2 in the pixel of Nth row, even column to be on, and meanwhile, the corresponding data line S(M) provides a positive voltage to make a source voltage of the charge control thin film transistor T1 in the pixel of Nth row, even column to be positive for charging the pixel of Nth row, even column; then, the clock signal CK provides a low voltage level of which the duration is a third duration t3 to control the charge control thin film transistor T2 in the pixel of Nth row, odd column to be on, and meanwhile, the corresponding data line S(M) provides a negative voltage to make the source voltage of the driving thin film transistor T1 in the pixel of Nth row, odd column to be negative for charging the pixel of Nth row, odd column; the first duration t1 is a sum of the second duration t2 and the third duration t3.

Scanning row by row sequentially in the same way until driving the frame is accomplished.

Specifically, the third duration t3 is not equal to the second duration t2, and the third duration t3 is larger than the second duration t2. That is to say, the charge duration of the negative voltage is not equal to the charge duration of the positive voltage, and the charge duration of the negative voltage is larger than the charge duration of the positive voltage to balance the charge effects of the pixels of two adjacent column with the positive, negative voltages to compensate the charge difference to the pixels of two adjacent columns caused by the positive, negative voltages for making the frame display effect uniform.

Step 3, driving the liquid crystal display panel of column inversion driving mode to show a latter frame.

Please combine FIG. 5 and FIG. 7. As the same illustration that the charge control thin film transistor T2' in the pixel of odd column is a P-type thin film transistor, and the charge control thin film transistor T2 in the pixel of even column is a N-type thin film transistor, for the pixel of Nth row, the Nth scan line provides the scan signal GATE(N) of which the duration is the first duration t1 to the gate of the driving thin film transistor T1 of the pixel of Nth row, and the clock signal CK first provides the high voltage level of which the duration is the third duration t3 to control the charge control thin film transistor T2 in the pixel of Nth row, even column to be on, and meanwhile, the data line S(M) provides a negative voltage to make a source voltage of the driving thin film transistor T1 in the pixel of Nth row, even column to be negative for charging the pixel of Nth row, even column; then, the clock signal CK provides the low voltage level of which the duration is the second duration t2 to control the charge control thin film transistor T2' in the pixel of Nth row, odd column to be on, and meanwhile, the data line S(M) provides a positive voltage to make the source voltage of the driving thin film transistor T1 in the pixel of Nth row, odd column to be positive for charging the pixel of Nth row, odd column.

Scanning row by row sequentially in the same way until driving the latter frame is accomplished.

Figure 3:
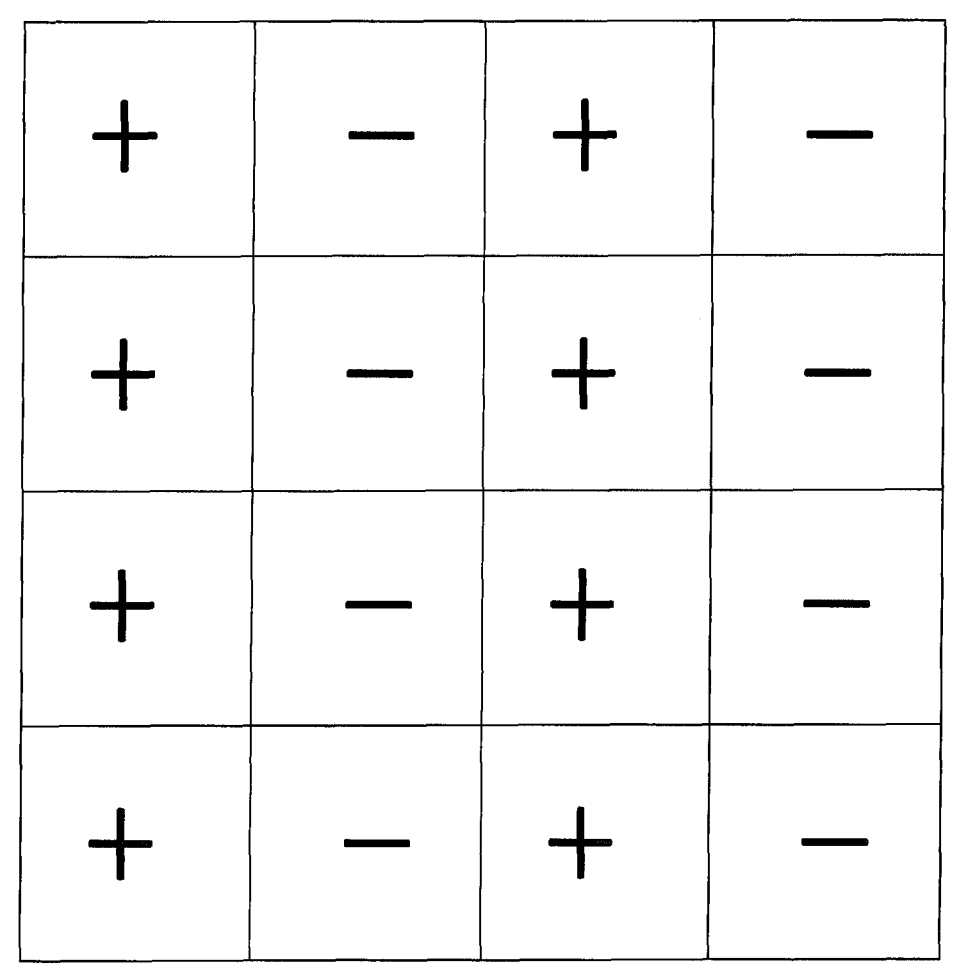
Figure 4:
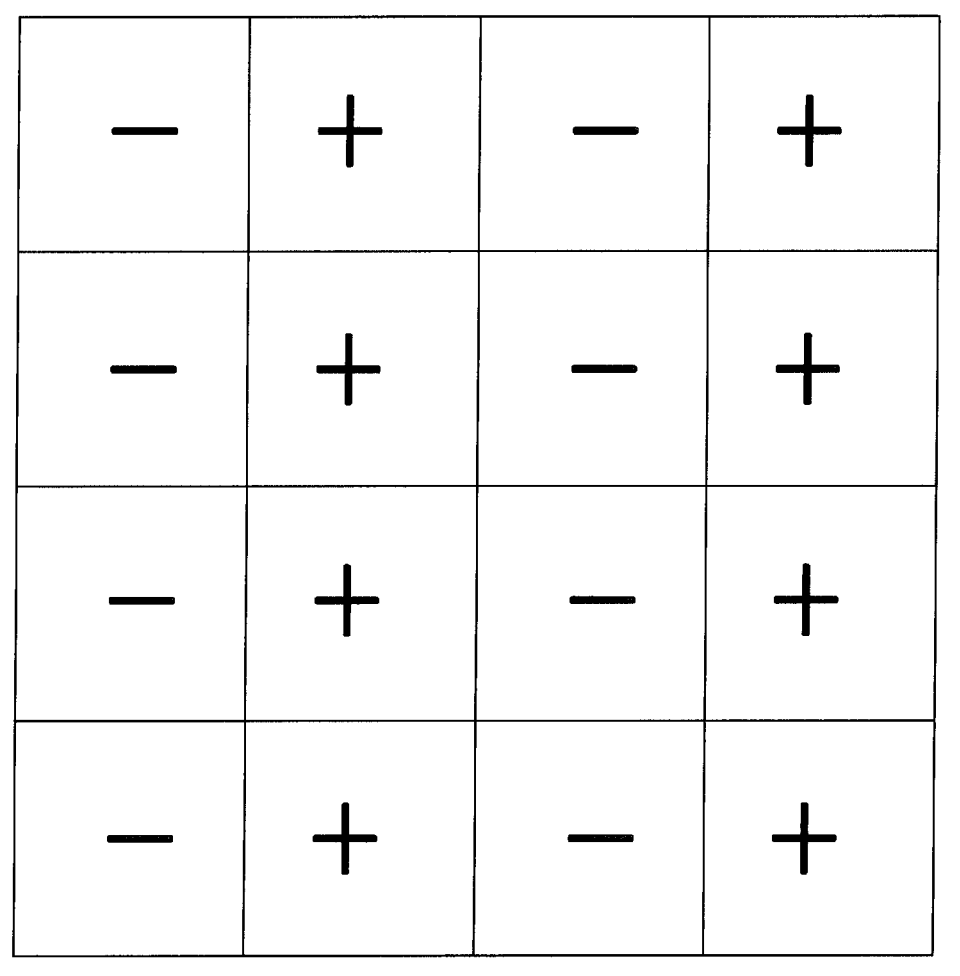

Furthermore, as shown in FIG. 3, FIG. 4, in the liquid crystal display panel of column inversion driving mode, the polarities of the pixels of every two adjacent columns are opposite, and the polarities of the same pixel for every two adjacent frames are opposite. Therefore, in the step 3, the duration of the high voltage level of the clock signal CK needs to be set to be the third duration t3, and the duration of the low voltage level has to be set to be the second duration t2 for ensuring that the charge duration of the negative voltage is always the third duration t3, and the charge duration of the positive voltage is always the second duration t2. According to the positive, negative voltages provided by the data line, the high, low voltage levels and pulse widths of the clock signal CK provided to the gate of the charge control thin film transistor T2 are adjusted to control the times of respectively charging the pixels of two adjacent columns with the positive, negative voltages, which can balance the charge effects of the pixels of two adjacent columns with the positive, negative voltages to compensate the charge difference to the pixels of two adjacent columns caused by the positive, negative voltages for making the frame display effect uniform.

Step 4, cycling steps 2, 3 for driving the liquid crystal display panel of column inversion driving mode to continuously show frames.

Significantly, as the charge control thin film transistor T2' in the pixel of odd column is a N-type thin film transistor, and the charge control thin film transistor T2 in the pixel of even column is a P-type thin film transistor, correspondingly in the step 2 and the step 3, the pixel of odd column needs to be charged first, and then the pixel of even column is charged. The rest of the procedure is similar. The repeated description is omitted here.

The aforesaid method can accomplish the driving to the liquid crystal display panel of column inversion driving mode, and the charge effect of the pixels will not be influenced because the positive, negative polarities and voltages are different.

In conclusion, the present invention provides a liquid crystal display panel of column inversion driving mode and a driving method thereof. With adding the charge control thin film transistor in the pixel driving circuit and according to the positive, negative voltages provided by the data line, the high, low voltage levels and pulse widths of the clock signal provided to the gate of the charge control thin film transistor are adjusted to control the times of respectively charging the pixels of two adjacent column with the positive, negative voltages, which can balance the charge effects of the pixels of two adjacent column with the positive, negative voltages to compensate the charge difference to the pixels of two adjacent columns caused by the positive, negative voltages for making the frame display effect uniform.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel of column inversion driving mode, comprising a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor, a charge control thin film transistor, a storage capacitor and a liquid crystal capacitor; one of the charge control thin film transistor in the pixel of even column and the charge control thin film transistor in the pixel of odd column is controlled by a high voltage level to be on, and the other is controlled by a low voltage level to be on;

both gates of the charge control thin film transistor in the pixel of even column and the charge control thin film transistor in the pixel of odd column are electrically coupled to a clock signal; the clock signal alternately provides the high, low voltage levels to control the charge control thin film transistor in the pixel of even column and the charge control thin film transistor in the pixel of odd column to be alternately on;

as the liquid crystal display panel of column inversion driving mode shows two adjacent frames: in the previous frame, the scan line provides a scan signal of which the duration is a first duration, and the clock signal first provides the high voltage level of which the duration is a second duration to control the charge control thin film transistor in the pixel of even column or the charge control thin film transistor in the pixel of odd column to be on, and meanwhile, the data line provides a positive voltage to make a source voltage of the driving thin film transistor in the pixel of even column or a source voltage of the driving thin film transistor in the pixel of odd column to be positive for charging the pixel of even column or the pixel of odd column; then, the clock signal provides a low voltage level of which the duration is a third duration to control the charge control thin film transistor in the pixel of odd column or the charge control thin film transistor in the pixel of even column, which is not on in the second duration to be on, and meanwhile, the data line provides a negative voltage to make the source voltage of the driving thin film transistor in the pixel of odd column or the source voltage of the driving thin film transistor in the pixel of even column to be negative for charging the pixel of odd column or the pixel of even column;

in the latter frame, the scan line provides the scan signal of which the duration is the first duration, and the clock signal first provides the high voltage level of which the duration is the third duration to control the charge control thin film transistor in the pixel of even column or the charge control thin film transistor in the pixel of odd column to be on, and meanwhile, the data line provides a negative voltage to make a source voltage of the driving thin film transistor in the pixel of even column or a source voltage of the driving thin film transistor in the pixel of odd column to be negative for charging the pixel of even column or the pixel of odd column; then, the clock signal provides the low voltage level of which the duration is the second duration to control the charge control thin film transistor in the pixel of odd column or the charge control thin film transistor in the pixel of even column, which is not on in the third duration to be on, and meanwhile, the data line provides a positive voltage to make the source voltage of the driving thin film transistor in the pixel of odd column or the source voltage of the driving thin film transistor in the pixel of even column to be positive for charging the pixel of odd column or the pixel of even column;

the first duration is a sum of the second duration and the third duration.

2. The liquid crystal display panel of column inversion driving mode according to claim 1, wherein the third duration is not equal to the second duration.

3. The liquid crystal display panel of column inversion driving mode according to claim 2, wherein the third duration is larger than the second duration.

4. The liquid crystal display panel of column inversion driving mode according to claim 1, wherein a gate of the driving thin film transistor is electrically coupled to the scan line corresponded with the row where the pixel is, and a source is electrically coupled to a drain of the charge control thin film transistor, and a drain is electrically coupled to one end of the storage capacitor and one end of the liquid crystal capacitor; a source of the charge control thin film transistor is electrically coupled to the data line corresponded with the column where the pixel is; both the other end of the storage capacitor and the other end of the liquid crystal capacitor are electrically coupled to a common electrode;

the charge control thin film transistor in the pixel of odd column is a P-type thin film transistor, and the charge control thin film transistor in the pixel of even column is a N-type thin film transistor; or the charge control thin film transistor in the pixel of odd column is a N-type thin film transistor, and the charge control thin film transistor in the pixel of even column is a P-type thin film transistor.

5. The liquid crystal display panel of column inversion driving mode according to claim 1, wherein the driving thin film transistor and the charge control thin film transistor are Low Temperature Poly-silicon thin film transistors, oxide semiconductor thin film transistors or amorphous silicon thin film transistors.

6. A liquid crystal display panel of column inversion driving mode, comprising a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor, a charge control thin film transistor, a storage capacitor and a liquid crystal capacitor; one of the charge control thin film transistor in the pixel of even column and the charge control thin film transistor in the pixel of odd column is controlled by a high voltage level to be on, and the other is controlled by a low voltage level to be on;

both gates of the charge control thin film transistor in the pixel of even column and the charge control thin film transistor in the pixel of odd column are electrically coupled to a clock signal; the clock signal alternately provides the high, low voltage levels to control the charge control thin film transistor in the pixel of even column and the charge control thin film transistor in the pixel of odd column to be alternately on;

as the liquid crystal display panel of column inversion driving mode shows two adjacent frames: in the previous frame, the scan line provides a scan signal of which the duration is a first duration, and the clock signal first provides the high voltage level of which the duration is a second duration to control the charge control thin film transistor in the pixel of even column or the charge control thin film transistor in the pixel of odd column to be on, and meanwhile, the data line provides a positive voltage to make a source voltage of the driving thin film transistor in the pixel of even column or a source voltage of the driving thin film transistor in the pixel of odd column to be positive for charging the pixel of even column or the pixel of odd column; then, the clock signal provides a low voltage level of which the duration is a third duration to control the charge control thin film transistor in the pixel of odd column or the charge control thin film transistor in the pixel of even column, which is not on in the second duration to be on, and meanwhile, the data line provides a negative voltage to make the source voltage of the driving thin film transistor in the pixel of odd column or the source voltage of the driving thin film transistor in the pixel of even column to be negative for charging the pixel of odd column or the pixel of even column;

in the latter frame, the scan line provides the scan signal of which the duration is the first duration, and the clock signal first provides the high voltage level of which the duration is the third duration to control the charge control thin film transistor in the pixel of even column or the charge control thin film transistor in the pixel of odd column to be on, and meanwhile, the data line provides a negative voltage to make a source voltage of the driving thin film transistor in the pixel of even column or a source voltage of the driving thin film transistor in the pixel of odd column to be negative for charging the pixel of even column or the pixel of odd column; then, the clock signal provides the low voltage level of which the duration is the second duration to control the charge control thin film transistor in the pixel of odd column or the charge control thin film transistor in the pixel of even column, which is not on in the third duration to be on, and meanwhile, the data line provides a positive voltage to make the source voltage of the driving thin film transistor in the pixel of odd column or the source voltage of the driving thin film transistor in the pixel of even column to be positive for charging the pixel of odd column or the pixel of even column;

the first duration is a sum of the second duration and the third duration;

wherein the third duration is not equal to the second duration;

wherein a gate of the driving thin film transistor is electrically coupled to the scan line corresponded with the row where the pixel is, and a source is electrically coupled to a drain of the charge control thin film transistor, and a drain is electrically coupled to one end of the storage capacitor and one end of the liquid crystal capacitor; a source of the charge control thin film transistor is electrically coupled to the data line corresponded with the column where the pixel is; both the other end of the storage capacitor and the other end of the liquid crystal capacitor are electrically coupled to a common electrode;

the charge control thin film transistor in the pixel of odd column is a P-type thin film transistor, and the charge control thin film transistor in the pixel of even column is a N-type thin film transistor; or the charge control thin film transistor in the pixel of odd column is a N-type thin film transistor, and the charge control thin film transistor in the pixel of even column is a P-type thin film transistor;

wherein the driving thin film transistor and the charge control thin film transistor are Low Temperature Polysilicon thin film transistors, oxide semiconductor thin film transistors or amorphous silicon thin film transistors.

7. The liquid crystal display panel of column inversion driving mode according to claim 6, wherein the third duration is larger than the second duration.

8. A driving method of a liquid crystal display panel of column inversion driving mode, comprising steps of:

step 1, providing the liquid crystal display panel of column inversion driving mode;

the liquid crystal display panel of column inversion driving mode comprises a plurality of data lines, which are mutually parallel, sequentially aligned and vertical, a plurality of scan lines, which are mutually parallel, sequentially aligned and horizontal and a plurality of pixels arranged in array, and each pixel comprises a pixel driving circuit inside; all the plurality of pixel driving circuits in the pixels of the same row are electrically coupled to the scan line corresponding to the pixel of the row; all the plurality of pixel driving circuits in the pixels of odd column and in the pixels of even column respectively at the left, right sides of each data line are electrically coupled to the data line;

the pixel driving circuit comprises: a driving thin film transistor, a charge control thin film transistor, a storage capacitor and a liquid crystal capacitor; one of the charge control thin film transistor in the pixel of even column and the charge control thin film transistor in the pixel of odd column is controlled by a high voltage level to be on, and the other is controlled by a low voltage level to be on;

both gates of the charge control thin film transistor in the pixel of even column and the charge control thin film transistor in the pixel of odd column are electrically coupled to a clock signal;

step 2, driving the liquid crystal display panel of column inversion driving mode to show a frame;

setting N, M to be positive integers, and for the pixel of Nth row, the Nth scan line provides a scan signal of which the duration is a first duration to the gate of the driving thin film transistor of the pixel of Nth row, and the clock signal first provides the high voltage level of which the duration is a second duration to control the charge control thin film transistor in the pixel of Nth row, even column or the charge control thin film transistor in the pixel of Nth row, odd column to be on, and meanwhile, the corresponding data line provides a positive voltage to make a source voltage of the driving thin film transistor in the pixel of Nth row, even column or a source voltage of the driving thin film transistor in the pixel of Nth row, odd column to be positive for charging the pixel of Nth row, even column or the pixel of Nth row, odd column; then, the clock signal provides a low voltage level of which the duration is a third duration to control the charge control thin film transistor in the pixel of Nth row, odd column or the charge control thin film transistor in the pixel of Nth row, even column, which is not on in the second duration to be on, and meanwhile, the corresponding data line provides a negative voltage to make the source voltage of the driving thin film transistor in the pixel of Nth row, odd column or the source voltage of the driving thin film transistor in the pixel of Nth row, even column to be negative for charging the pixel of Nth row, odd column or the pixel of Nth row, even column; the first duration is a sum of the second duration and the third duration;

scanning row by row sequentially in the same way until driving the frame is accomplished;

step 3, driving the liquid crystal display panel of column inversion driving mode to show a latter frame;

for the pixel of Nth row, the Nth scan line provides the scan signal of which the duration is the first duration to the gate of the driving thin film transistor of the pixel of Nth row, and the clock signal first provides the high voltage level of which the duration is the third duration to control the charge control thin film transistor in the pixel of Nth row, even column or the charge control thin film transistor in the pixel of Nth row, odd column to be on, and meanwhile, the data line provides a negative voltage to make a source voltage of the driving thin film transistor in the pixel of Nth row, even column or a source voltage of the driving thin film transistor in the pixel of Nth row, odd column to be negative for charging the pixel of Nth row, even column or the pixel of Nth row, odd column; then, the clock signal provides the low voltage level of which the duration is the second duration to control the charge control thin film transistor in the pixel of Nth row, odd column or the charge control thin film transistor in the pixel of Nth row, even column, which is not on in the third duration to be on, and meanwhile, the data line provides a positive voltage to make the source voltage of the driving thin film transistor in the pixel of Nth row, odd column or the source voltage of the driving thin film transistor in the pixel of Nth row, even column to be positive for charging the pixel of Nth row, odd column or the pixel of Nth row, even column;

scanning row by row sequentially in the same way until driving the latter frame is accomplished;

step 4, cycling steps 2, 3 for driving the liquid crystal display panel of column inversion driving mode to continuously show frames.

9. The driving method of the liquid crystal display panel of column inversion driving mode according to claim 8, wherein the third duration is not equal to the second duration.

10. The driving method of the liquid crystal display panel of column inversion driving mode according to claim 9, wherein the third duration is larger than the second duration.

11. The driving method of the liquid crystal display panel of column inversion driving mode according to claim 8, wherein a gate of the driving thin film transistor is electrically coupled to the scan line corresponded with the row where the pixel is, and a source is electrically coupled to a drain of the charge control thin film transistor, and a drain is electrically coupled to one end of the storage capacitor and one end of the liquid crystal capacitor; a source of the charge control thin film transistor is electrically coupled to the data line corresponded with the column where the pixel is; both the other end of the storage capacitor and the other end of the liquid crystal capacitor are electrically coupled to a common electrode;

the charge control thin film transistor in the pixel of odd column is a P-type thin film transistor, and the charge control thin film transistor in the pixel of even column is a N-type thin film transistor; or the charge control thin film transistor in the pixel of odd column is a N-type thin film transistor, and the charge control thin film transistor in the pixel of even column is a P-type thin film transistor.

12. The driving method of the liquid crystal display panel of column inversion driving mode according to claim 8, wherein the driving thin film transistor and the charge control thin film transistor are Low Temperature Polysilicon thin film transistors, oxide semiconductor thin film transistors or amorphous silicon thin film transistors.

* * * * *